United States Patent Office 3,394,179
Patented July 23, 1968

3,394,179
REACTION PRODUCTS OF PHOSPHOSULFURIZED HYDROCARBON AND AMIDES OF HIGH MOLECULAR WEIGHT MONOCARBOXYLIC ACIDS AND POLYAMINES
Edwin C. Younghouse, Cranford, N.J., assignor to Esso Research and Engineering Company, a corporation of Delaware
No Drawing. Filed Oct. 23, 1965, Ser. No. 504,164
5 Claims. (Cl. 260—561)

ABSTRACT OF THE DISCLOSURE

The reaction product of from 10 to 175 parts by weight of a phosphosulfurized hydrocarbon and 100 parts by weight of the amide of an aliphatic polyamine and a high molecular weight monocarboxylic acid is a highly effective detergent, dispersant and antioxidant for an oil composition such as gasoline, fuel oil, diesel fuel or lubricating oil. The monocarboxylic acid portion of the amide is prepared by halogenating a 600 to 3000 molecular weight polymer of a $C_2$ to $C_5$ mono-olefin and then condensing the halogenated product with an alpha, beta-olefinically unsaturated monocarboxylic acid of from 3 to 9 carbon atoms or with a $C_1$ to $C_{10}$ saturated aliphatic alcohol ester of such acid. To form the amide the high molecular weight carboxylic acid or ester obtained by the foregoing procedure is further reacted with an alkylene polyamine or an N-amino alkyl piperazine, using a mole ratio of acid or ester to polyamine or piperazine of from about 1:1 to about 5:1. The phosphosulfurized hydrocarbon is prepared by reacting a terpene, a petroleum fraction or a 500 to 200,000 molecular weight polymer of a $C_2$ to $C_6$ olefin with from 5 to 40 weight percent of a sulfite of phosphorus.

---

The present invention concerns improvements in oil-soluble nitrogen-containing additives for oil compositions of the class of gasolines, fuel oils, heating oils, and lubricating oils. These additives can be characterized as amides of high molecular weight carboxylic acids wherein the amides have been reacted with phosphosulfurized hydrocarbons. The invention is also directed to the preparation of these reaction products and to oleaginous compositions containing them.

In copending application Ser. No. 337,187 of Roger E. Chandler filed Jan. 13, 1964, now abandoned it is taught that effective ash-free, mineral-oil-soluble, detergent inhibitors and dispersants for oleaginous materials can be prepared by condensing a halogenated high molecular weight olefin polymer with an alpha, beta-unsaturated monocarboxylic acid to form a high molecular weight acid having a long aliphatic chain and subsequently reacting the latter acid with a polyalkylene polyamine under conditions causing amide formation. The detergent inhibitors and dispersants thus prepared are useful for imparting high detergency, high oxidation resistance, and efficient sludge dispersing action in lubricating oils for high compression piston-type internal combustion engines. The additives are also useful in motor fuels, fuel oil compositions, and diesel fuels.

It has now been found in accordance with the present invention that the ashless dispersant additives prepared as disclosed in the aforementioned application of Roger E. Chandler can be improved with respect to oxidation inhibition and particularly with respect to corrosivity toward copper-lead bearings by further reacting the materials with phosphosulfurized hydrocarbons.

To prepare the high molecular weight carboxylic acids, the preferred starting material is a polymer of a $C_2$ to $C_5$ mono-olefin, e.g. polyethylene, polypropylene or polyisobutylene, wherein the olefin polymer has an average molecular weight within the range of from about 600 to about 3000. Especially useful products are obtained when the molecular weight range is from about 800 to about 1900. Such polymers have in the range of from about 40 to 250 carbon atoms, and more preferably within the range of about 50 to about 120 carbon atoms, per molecule. The selected polymer is halogenated with either bromine or chlorine, preferably the latter, using sufficient halogen to provide about one to two atoms per molecule of the olefin polymer. The halogenation step may be conducted in the temperature range of from about ordinary ambient temperatures to about 250° F. In a representative plant scale operation involving the chlorination of polyisobutylene of 830 molecular weight, a 100-pound batch will be chlorinated with 10 pounds of chlorine introduced into the reactor over a period of 3½ hours with a chlorination temperature of about 250° F.

The halogenated polymer thus obtained is condensed with an alpha, beta-unsaturated monocarboxylic acid of from 3 to 9 carbon atoms. Such acids include acrylic acid, alpha-methylacrylic acid (i.e. 2-methyl propenoic acid), crotonic acid, isocrotonic acid (beta-methylacrylic acid), tiglic acid (alpha-methylcrotonic acid), angelic acid (alpha-methylisocrotonic acid), sorbic acid, and cinnamic acid.

In condensing the halogenated polyolefin with the unsaturated acid, at least one mole of acid is used per mole of halogenated polyolefin. Normally, the acid will be employed in excess and may amount to as much as 1.5 to 2 moles per mole of halogenated polyolefin. The condensation temperature may be in the range of from about 300° to 500° F. and will more preferably be within the range of from about 375° to 475° F. The condensation may require from about 3 to about 24 hours but will ordinarily take place in from 6 to 18 hours. After the reaction has been completed, excess acid may be purged from the mixture, for example, by blowing with a stream of nitrogen at a temperature of 400° to 500° F.

The high molecular weight carboxylic acid obtained by the foregoing procedure is further reacted with a polyalkylene polyamine under conditions favoring amide formation. Generally, the mole ratio of acid to polyamine will be in the range of 1:1 to 3:1, although higher ratios, i.e. as high as 5:1, may be employed if there are sufficient amino groups in the polyamine.

These ashless dispersants can also be prepared by reaction of the polyalkylene polyamines with $C_1$ to $C_{10}$ aliphatic alcohol esters of the high molecular weight carboxylic acids, in which case an alcohol rather than water is split out during the formation of the amide. The ester of the high molecular weight carboxylic acid is most conveniently prepared by condensing a halogenated polyolefin in the above-described manner with an ester of an alpha, beta-unsaturated acid such as ethyl acrylate, isopropyl methacrylate, butyl acrylate, methyl methacrylate, and the like. Esters of $C_1$ to $C_5$ aliphatic alcohols are preferred. Mole ratios and reaction conditions are essentially the same for the reactions involving the esters as for the acids as described herein.

The aliphatic polyamine that is employed in preparing the reaction products of the present invention may be an alkylene polyamine fitting the following general formula:

$$NH_2(CH_2)_n—[NH(CH_2)_n]_m—NH_2$$

wherein $n$ is 2 to 3 and $m$ is a number from 0 to 10. Specific compounds coming within the formula include diethylenetriamine, tetraethylenepentamine, dipropylenetriamine, octaethylenenonamine, and tetrapropylenepentamine. N,N-di-(2-aminoethyl) ethylenediamine may also be used. Other aliphatic polyamino compounds that may be used are the N-aminoalkylpiperazines of the formula:

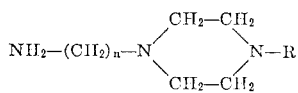

wherein $n$ is a number 1 to 3, and R is hydrogen or an aminoalkyl radical containing 1 to 3 carbon atoms. Specific examples include N-(2-aminoethyl) piperazine, N-(2-aminoisopropyl) piperazine, and N,N'-di-(2-aminoethyl) piperazine.

The use of mixtures of alkylene polyamines, mixtures of N-aminoalkyl piperazines, and mixtures of the alkylene polyamines with the N-aminoalkyl piperazines is also contemplated, and the term aliphatic polyamine is intended to embrace all of these materials.

The reaction temperatures for amide formation will generally be in the range of from about 200° to 400° F. In most cases, a narrower range of from about 250° to about 350° F. will be used. The reaction time will depend to some extent upon the reaction temperature. The composition of the reaction can be determined by measuring the amount of water or alcohol that is split off during the reaction. If desired, a water-entraining solvent, such as heptane, can be employed to remove the water as an azeotrope.

In accordance with the present invention the dispersant additives prepared as described above are further reacted with phosphosulfurized hydrocarbons. The preparation of phosphosulfurized hydrocarbons is well known in the art and involves reacting a sulfide of phosphorus such as $P_2S_3$, $P_2S_5$, $P_4S_7$, and the like, and preferably $P_2S_5$, with a hydrocarbon material such as terpene, a heavy petroleum fraction, or a polyolefin. The preparation of phosphosulfurized hydrocarbons is more fully described in U.S. Patent 2,875,188 and in U.S. Patent 2,316,078. The preferred hydrocarbon materials for treatment with phosphorus sulfides are the olefin polymers having Staudinger molecular weights in the range of about 500 to about 200,000 and containing from 2 to 6 carbon atoms per olefin monomer. Polymers of ethylene, propylene, butylene, isobutylene, or isoamylene may be employed, for example. Particularly preferred are the polymers of butylene or isobutylene having Staudinger molecular weights in the range of from about 600 to about 100,000 and still more particularly phosphosulfurized polybutene of about 800 to 1900 molecular weight. The term "polybutene" as used in the claims is intended to embrace polymers of both butylene and isobutylene. The phosphosulfurized hydrocarbon can be prepared by reacting the hydrocarbon base stock with from about 5 to 40 wt. percent of a sulfide of phophorus and preferably with from about 10 to about 20 wt. percent of phosphorus pentasulfide. The reaction is conducted under anhydrous conditions at temperatures from about 150° to about 600° F. for from about ½ to about 15 hours. In addition to polyolefins other hydrocarbons may be employed such as a terpene, e.g. pinene, or a petroleum distillate, or a residuum containing less than 5° of aromatic hydrocarbons and having a viscosity at 210° F. in the range of from about 140 to about 250 SUS.

To prepare the additives of the present invention, the carboxylic amide is reacted with from about 10 to about 175 wt. percent of the phosphosulfurized hydrocarbon. Preferably 100 parts of the amide are reacted with from about 25 to about 100 parts of the phosphosulfurized hydrocarbon. While the products obtained with more than 100 parts of phosphosulfurized hydrocarbon per 100 parts of amide are still effective in antioxidant and corrosion inhibiting properties they tend to be objectionable from the standpoint of odor and $H_2S$ evolution and are hence not as desirable as the products of the preferred proportions set forth above.

The reaction may be conducted at temperatures in the range of about 170° to about 350° F. but a temperature range of about 200° to 300° F. is preferred. Reaction times may vary within the range of about 1 to 16 hours and the product may be purged with an inert gas such as nitrogen to free it of evolved $H_2S$.

The invention wil be more fully understood when reference is made to the following examples.

EXAMPLE 1

(Part A)

One hundred ten (110) pounds of polyisobutylene of 780 molecular weight was heated to 250° F. Chlorine gas was then bubbled through the polyisobutylene at that temperature for a period of 4 hours at the rate of 2.5 pounds per hour. Following the chlorination step with a total of 10 pounds of chlorine, the chlorinated polyisobutylene had a chlorine content of 4.3% and an API gravity of 23.3. To the chlorinated polyisobutylene thus prepared there was added 10.5 pounds of acrylic acid and the mixture was heated gradually to 450° F. during a period of 2 hours, the pressure being increased to 20 p.s.i.g. during this period. Heating was continued for 5 hours at 425° F., the pressure being maintained at 20 p.s.i.g. by venting the hydrogen chloride that was evolved during the reaction. The mixture was then purged with nitrogen for 2 hours at the reaction temperature to remove unrecated acrylic acid. The product, identified as polyisobutenyl propionic acid, contained, 0.3 wt. percent of chlorine and had a total acid number (ASTM D-664) of 46.2 mg. KOH/gm.

A mixture of 638 grams of polyisobutenyl propionic acid, prepared as described, 352 grams of a solvent neutral mineral oil (150 SUS viscosity at 100° F.) and 61 grams of tetraethylenepentamine was heated with stirring to 300° F. for 6 hours, during which time the mixture was continuously purged with nitrogen to remove water formed during the condensation of the acid and the polyamine. The product of the reaction was filtered through diatomaceous earth and was found to contain 1.8 wt. percent nitrogen.

(Part B)

A phosphosulfurized hydrocarbon was prepared by reacting 100 parts by weight of a polyisobutylene having an average Staudinger molecular weight of about 850 with 15 parts by weight of phosphorus pentasulfide for about 8 hours at a temperature in the range of 425° to 450° F., the mixture being stirred and blown with nitrogen during the reaction. The resulting phosphosulfurized polyisobutylene analyzed 3.9 wt. percent phosphorus and about 7.1 wt. percent sulfur.

(Part C)

The phosphosulfurized polyisobutylene prepared as above was reacted with the product of Part A in various weight proportions, namely in the proportions of 3 parts by weight, 2 parts by weight, and 1 part by weight, respectively of the Part A product to 1 part by weight of the Part B product, i.e. the phosphosulfurized hydrocarbon. In each case the Part A material was charged to a reaction flask and heated to 200° F. with stirring. Then the selected quantity of the phosphosulfurized polyisobutylene was added, causing a temperature rise of about 10° to 20° F., depending on the ratio of reactants. The temperature was then increased to 250° F. and stirring was continued at that temperature for 2 hours, after which the mixture was purged with nitrogen for an additional hour at 250° F. No filtering of the product was required. Since the Part A product was a concentrate having about 34 wt. percent diluent oil and about 66 wt. percent of actual product ingredient, the reaction proportions on an actual basis were 100 parts of the amide to about 50 parts, 75 parts, and 150 parts respectively of the phosphosulfurized hydrocarbon.

EXAMPLE 2

A stream of chlorine gas is passed through 800 grams of polyisobutylene of 950 molecular weight at 200° F. for 4 hours, at the rate of 200 cc. of chlorine per minute. The chlorinated product is reacted with 105.6 grams of ethyl acrylate for 5 hours at 425° F. Excess unreacted ethyl acrylate is stirpped from the reaction mixture by nitrogen blowing, yielding a product which is identified as polybutenyl propionic acid ethyl ester. A 400-gram portion of the latter ester is dissolved in 176 grams of a refined neutral mineral oil of 150 SSU viscosity measured at 100° F. and then 18 grams of tetraethylenepentamine is added. This mixture is heated for 18 hours at 300° F. while a stream of nitrogen is passed through the mixture to scavenge ethanol as it is formed. The product after filtration has a nitrogen content of 0.53 wt. percent.

The amide product obtained in the foregoing procedure is condensed with a phosphosulfurized polyisobutylene at 200° to 250° F. in the manner of Example 1, using 75 parts by weight of the amide product and 25 parts by weight of the phosphosulfurized polyisobutylene. The latter material has been obtained by reacting 100 parts by weight of 960 molecular weight polyisobutylene with 12 parts by weight of $P_2S_5$ at 430° F.

EXAMPLE 3

Using a highly refined mineral oil base stock of the SAE 30 viscosity grade, various blends were prepared. In one case, 4 wt. percent of the product of Part A of Example 1 was employed. Three additional blends were prepared using the reaction products of Part C of Example 1. Each of these blends and the base oil were subjected to a lubricant stability test, in which the oil composition is heated for 23 hours at 340° F. in the presence of copper-lead bearings, the oil being intimately mixed with air during the test. The viscosity increase of the oil, measured in SSU at 100° F., and the corrosion weight loss of the bearings are determined at the end of the test. The results obtained are given in Table I, which follows.

TABLE I.—STABILITY TEST RESULTS

|  | Viscosity Increase, Percent | CuPb Bearing, Weight Loss |
|---|---|---|
| Base Oil Alone | 50 | 332 |
| Base Oil Plus: |  |  |
| 4 wt. Percent, Part A Example 1 Product | 34.5 | 486 |
| 4 wt. Percent, Product C-1 | 10.0 | 49 |
| 4 wt. Percent, Product C-2 | 10.0 | 34 |
| 4 wt. Percent, Product C-3 | 12.3 | 42 |

NOTE.—Products C-1, C-2, C-3 obtained by reacting Part A Example 1 product concentrate with phosphosulfurized polybutene in weight proportions (former to latter) 3 to 1, 2 to 1, and 1 to 1, respectively.

It will be seen that each of the products prepared in accordance with the present invention was effective in reducing the corrosivity of the base oil and in improving the oxidation stability of the oil as measured by viscosity increase. The products of the invention were also more effective than the untreated high molecular weight polyamine amide in improving the oxidation stability of the oil and were highly effective in reducing the corrosivity of the amide.

EXAMPLE 4

Blends were prepared in which each of the products, C-1, C-2, and C-3 was added in 5 wt. percent concentration in a base oil. Each of the blends was subjected to a test for $H_2S$ evolution in which test an 800 cc. sample of the oil is placed in a 1-liter stoppered container and then heated in an oven for one hour at 100° F.; then moistened lead acetate paper is placed over the neck of the uncapped container for five minutes and thereafter dried and compared with standardized test spots rated numerically from zero (perfectly white) to 5 (essentially black). In this test, the blends containing products C-1 and C-2 each gave a rating of less than 1, whereas the blend containing product C-3 gave a rating of 4. A blend prepared by adding 5 wt. percent of untreated phosphosulfurized polyisobutylene (Example 1, Part B product) gave a rating of 5 in this test. It is seen from the results that when the proportion of phosphosulfurized hydrocarbon to amide in the reaction products of the present invention is relatively high (i.e. 150 to 100) the products are not as satisfactory as those prepared with lower proportions of phosphosulfurized hydrocarbon from the standpoint of $H_2S$ evolution, although they are acceptable from the standpoint of bearing corrosion inhibition as shown in Table I, above.

EXAMPLE 5

An additive was prepared in accordance with Part C of Example 1, using 62.5 wt. percent of the Part A product concentrate and 37.5 wt. percent of the phosphosulfurized polyisobutylene (Part B product). The additive, which is here referred to a Additive C-4 was blended in 4 wt. percent concentration in a highly refined lubricating oil base stock of SAE 30 viscosity grade. Additional oxidation stability was imparted by also adding 0.5 wt. percent of a bisphenol antioxidant known as Ethyl 728. For comparison, a blend was prepared by adding to another portion of the same base stock 4 wt. percent of the product of Part A, Example 1, 0.7 wt. percent of the same bisphenol antioxidant and (to compensate for the known corrosiveness of the Part A product) 0.4 wt. percent of a corrosion inhibitor identified as a thiadiazoline disulfide and known as Amoco 150. Each of these blends was subjected to a 96-hour test in a Chevrolet 6-cylinder gas engine having a displacement if 216.5 cu. in. At the end of the test the engine was dismantled and various parts were rated, using a demerit system in which zero represents a perfectly clean part and 10 represents maximum deposits. The observed ratings are given in Table II, which follows, together with rating in similar tests which were run, for comparison, on the base oil alone and on a widely marketed gas engine lubricant. The test conditions included a speed of 1500 r.p.m., a torque load of 120 to 130 lb. ft., spark advance of 30 degrees BTC, an oil temperature of 220° F. and a coolant temperature of 200° F. Natural gas, chiefly methane, was used as the fuel.

TABLE II.—GAS ENGINE DEMERIT RATINGS 96-HOUR TEST

| Demerits | Base Oil | Blend A— Base Oil+ 4% Product C-4+0.5% Antioxidant | Blend B— Base Oil+4% Part A Product+ 0.7% Antioxidant +0.4% Corrosion Inhibitor | Commercial Gas Engine Lubricant |
|---|---|---|---|---|
| Piston Skirt Varnish | 0.20 | 0.08 | 0.12 | 0.10 |
| Ring Zone | 0.85 | 0.33 | 0.30 | 0.43 |
| Ring Sticking | 1.9 | (1) | (1) | (1) |
| Piston Undersides | 1.2 | 0.2 | 0.2 | 0.50 |
| Overall | 0.63 | 0.12 | 0.20 | 0.22 |

[1] Nil.

It will be seen from the data in Table II that an additive of the present invention (Blend A) was superior to unmodified amide of a polyamine and a high molecular weight carboxylic acid (Blend B) with respect to reducing the overall demerit rating of the base oil. Furthermore, Blend A was superior to the commercial gas engine lubricant in its overall performance.

EXAMPLE 6

The storage stability and corrosion properties of a heating oil comprising a mineral oil distillate having a boiling range of about 360° to 660° F. and derived from mixed straight run and cracked distillates are improved by incorporating therein 0.03 wt. percent of reaction product C–2 of Example 1.

EXAMPLE 7

About 0.005 wt. percent of additive C–4, described in Example 4, is added to a leaded gasoline to impart carburetor detergency and corrosion preventing properties thereto.

The additives of this invention may be employed in concentrations ranging from about 0.002 to about 10 wt. percent in oil compositions ranging from gasoline fractions through middle distillate fuels and lubricating oils.

For use as lubricating oil additives the reaction products of this invention may be incorporated in lubricating oil compositions in concentration ranges of from about 0.1 to about 10 wt. percent on an actual ingredient basis, and will ordinarily be used in concentrations of from about 0.1 to about 5 wt. percent. The lubricating oils to which the additives of the invention may be added include not only mineral lubricating oils, but synthetic oils alone. The mineral lubricating oils may be of any preferred types, including those derived from the ordinary paraffinic, naphthenic, asphaltic, or mixed base mineral crude oils by suitable refining methods. Synthetic hydrocarbon lubricating oils may also be employed. Other synthetic oils include dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, and complex esters, as for example the complex ester formed by the reaction of 1 mole of sebacic acid with 2 moles of tetraethylene glycol and 2 moles of 2-ethyl hexanoic acid.

The additives of this invention may also be employed in middle distillate fuels for inhabiting corrosion and the formation of sludge and sediment in such fuels. Concentration ranges of from about 0.002 to about 2 wt. percent or more, generally from about 0.005 to about 0.2 wt. percent are employed. Petroleum distillate fuels boiling in the range of from about 300° to about 900° F. are contemplated. Typical of such fuels are No. 1 and No. 2 fuel oils that met ASTM Specification D–396–48T, diesel fuels qualifying as Grades 1D, 2D and 4D of ASTM Specification D–975–51T, and various jet engine fuels. Because they are ashless, these additives are particularly desirable for such fuels in that they do not give rise to glowing ashes nor deter from the burning qualities of the distillates. These additives may also be used in conjunction with other prior art ashless additives for fuels, such as polymers of acrylic or methacrylic acid esters, high molecular weight aliphatic amines, etc.

The additives of this invention may also be employed either alone or in combination with other hydrocarbon-soluble additives, in jet fuels and gasolines in concentrations ranging from about 0.001 to 1.0 wt. percent as detergent and/or rust or corrosion preventive additives.

In either the fuel or lubricant compositions, other conventional additives may also be present, including dyes, pour-point depressants, antiwear agents, e.g. tricresyl phosphate, zinc dialkyl dithiophosphates of 3 to 8 carbon atoms, antioxidants such as phenyl-alpha-naphthylamine, tert. octylphenol sulfide, bis-phenols such as 4,4′-methylene bis (2,6-di tert. butylphenol), viscosity index improvers such as polymethacrylates, polyisobutylene, alkyl fumarate-vinyl acetate copolymers, and the like, as well as other dispersants.

The dispersant additives of the invention may be employed to enhance the dispersancy-detergency and/or to improve the oxidation stability or corrosion inhibition of lubricants containing conventional detergents, wherein the later are used in concentrations in the range of about 0.5 to 5 wt. percent. When the conventional detergents or dispersants are metal-containing materials it is possible, by utilizing the additives of the present invention in combination therewith, to obtain added dispersancy or detergency without materially increasing the total ash-forming properties of the composition. Such metal-containing detergents or combination detergent-inhibitors include the alkaline earth metal salts of alkylated phenols or of alkylated phenol sulfides, as for example barium-calcium nonylphenol sulfide, and the alkaline earth metal salts of high molecular weight sulfonic acids derived from natural or synthetic hydrocarbons, such as calcium petroleum sulfonate or an overbased barium $C_{12}$ alkyl benzene sulfonate.

The dispersants of this invention may also be used in conjunction with other ashless detergents or dispersants such as high molecular weight polymeric dispersants made with one or more polar monomers, such as vinyl acetate, vinyl pyrrolidone, methacrylates, fumarates and maleates. These dispersants have molecular weights in the range of about 500 to 50,000. One example is a copolymer of 65 to 85 wt. percent of mixed $C_9$ to $C_{12}$ fumarates, 10 to 20 wt. percent of vinyl acetate, and 5 to 15 wt. percent of N-vinyl pyrrolidone. Still other ashless dispersants include nitrogen-containing derivatives of high molecular weight alkenyl succinic anhydrides such as described in U. S. Patents 3,018,247; 3,018,250; and 3,018,921; in British Patent 922,831; and in Canadian Patent 666,916. A particularly effective derivative of this general type is prepared by reacting a long-chain alkenyl succinic anhydride (derived by condensation of polyisobutylene of about 1000 molecular weight with maleic anhydride) with an alkylene polyamine, specifically tetraethylenepentamine, to form an N-substituted alkenyl succinimide.

It is possible in practicing this invention to prepare additive concentrates in which the concentration of additive is greater than would normally be employed in a finished lubricant. These concentrates may contain in the range of from 10 to 80 percent of additive on an active ingredient basis, the balance being a hydrocarbon oil, usually a mineral oil. Such concentrates are convenient for handling the additive in the ultimate blending operation into a finished lubricating oil composition. The additive concentrates may be made up simply of an additive of the present invention in a suitable mineral oil medium or they may include other additives that are intended for use along with the additives of the invention in a finished lubricant.

While the lubricant compositions herein described are primarly designed as internal combustion engine crankcase lubricants, the additives of the invention may also be employed in other oil compositions, including turbine oils, various industrial oils, gear oils, hydraulic fluids, transmission fluids and the like.

It is to be understood that the specific examples presented in the foregoing specification are merely illustrative and are not intended to limit the scope of the invention in any manner.

What is claimed is:

1. Method as defined by claim 3 wherein said phosphosulfurized hydrocarbon is a phosphosulfurized $C_2$ to $C_6$ olefin polymer of from 500 to 200,000 molecular weight.

2. The product obtained by the method of claim 3.

3. A method for preparing an oil-soluble additive which comprises reacting one molecular proportion of an unsubstituted aliphatic polyamine with from 1 to 5 molecular proportions of a high molecular weight monocarboxylic acid compound under conditions forming an amide and thereafter reacting, at a temperature in the range of about 170° to about 350° F., 100 parts by weight of the amide thereby formed with from 10 to 175 parts by weight of a phosphosulfurized hydrocarbon, said high molecular weight monocarboxylic acid compound being derived by condensing an alpha, beta-olefinically unsaturated unsubstituted $C_3$ to $C_9$ monocarboxylic acid or the $C_1$ to $C_{10}$ saturated aliphatic alcohol ester of said last-named acid, with a halogenated $C_2$ to $C_5$ mono-olefin polymer of from 600 to 3000 molecular weight, said aliphatic polyamine being selected from the class consisting of N,N-di-(2-aminoethyl)ethylene diamine, an alkylene polyamine having the formula:

$$NH_2(CH_2)_n\text{—}[NH(CH_2)_n]_m\text{—}NH_2$$

wherein $n$ is 2 to 3 and $m$ is a number from 0 to 10, and a N-aminoalkyl piperazine of the formula:

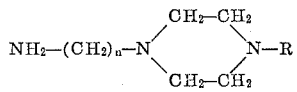

wherein $n$ is a number 1 to 3 and R is selected from the group consisting of hydrogen and an aminoalkyl radical of 1 to 3 carbon atoms, said phosphosulfurized hydrocarbon being selected from the class consisting of a phosphosulfurized terpene, a phosphosulfurized petroleum fraction, and a phosphosulfurized olefin polymer of from 500 to 200,000 molecular weight and containing from 2 to 6 carbon atoms per olefin monomer.

4. An oil-soluble additive obtained by reacting one molecular proportion of an unsubstituted aliphatic polyamine with from 1 to 5 molecular proportions of a high molecular weight monocarboxylic acid compound under amide-forming conditions and thereafter reacting at a temperature in the range of about 170° to about 350° F., 100 parts by weight of the product of that reaction with from 25 to 100 parts by weight of a phosphosulfurized polybutene of about 600 to about 100,000 molecular weight, said high molecular weight carboxylic acid compound being selected from the group consisting of acids, and the $C_1$ to $C_{10}$ saturated aliphatic alcohol esters thereof, that have been prepared by condensing an alpha, beta-olefinically unsaturated unsubstituted monocarboxylic acid of from 3 to 9 carbon atoms, or the $C_1$ to $C_{10}$ saturated aliphatic alcohol ester thereof, with a halogenated $C_2$ to $C_5$ mono-olefinic polymer of from 600 to 3000 molecular weight, said aliphatic polyamine having the formula:

$$NH_2(CH_2)_n\text{—}[NH(CH_2)_n]_m\text{—}NH_2$$

wherein $n$ is 2 to 3 and $m$ is a number from 0 to 10.

5. The additive defined by claim 4 wherein said high molecular weight carboxylic acid compound is polyisobutenyl propionic acid, said alpha, beta-unsaturated monocarboxylic acid is acrylic acid, said mono-olefinic polymer is polyisobutylene of from 800 to 1900 molecular weight, and said phosphosulfurized polybutene is obtained from polybutene of about 800 to about 1900 molecular weight.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 3,219,666 | 11/1965 | Norman et al. | 260—268 |

NICHOLAS S. RIZZO, *Primary Examiner.*

JOSE TOVAR, *Assistant Examiner.*